(12) United States Patent
Nagura et al.

(10) Patent No.: US 10,809,562 B2
(45) Date of Patent: Oct. 20, 2020

(54) LIQUID CRYSTAL DISPLAY DEVICE

(71) Applicant: FUJIFILM Corporation, Tokyo (JP)

(72) Inventors: Masato Nagura, Kanagawa (JP); Ryuji Saneto, Kanagawa (JP); Yuuichi Fukushige, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 77 days.

(21) Appl. No.: 16/121,711

(22) Filed: Sep. 5, 2018

(65) Prior Publication Data

US 2019/0004368 A1 Jan. 3, 2019

Related U.S. Application Data

(63) Continuation of application No. PCT/JP2017/003883, filed on Feb. 3, 2017.

(30) Foreign Application Priority Data

Mar. 23, 2016 (JP) .................................. 2016-057949

(51) Int. Cl.
*G02F 1/1335* (2006.01)
*G02B 5/30* (2006.01)
*G02F 1/13357* (2006.01)
*G02F 1/1333* (2006.01)

(52) U.S. Cl.
CPC .......... *G02F 1/133528* (2013.01); *G02B 5/30* (2013.01); *G02F 1/1336* (2013.01); *G02F 1/133305* (2013.01); *G02F 1/133504* (2013.01); *G02F 1/133602* (2013.01); *C09K 2323/03* (2020.08); *C09K 2323/035* (2020.08); *G02F 2201/50* (2013.01)

(58) Field of Classification Search
CPC ... G02B 5/30; G02B 5/3033; G02F 1/133305; G02F 1/133504; G02F 1/133528; G02F 1/1336; G02F 1/133602; G02F 2201/50; Y10T 428/1036; Y10T 428/105; C09K 2323/03; C09K 23/035
See application file for complete search history.

(56) References Cited

U.S. PATENT DOCUMENTS 5,709,948 A * 1/1998 Perez ..................... B32B 27/38
428/413
2003/0020208 A1 * 1/2003 Tasaka .................... B29C 41/24
264/217

FOREIGN PATENT DOCUMENTS

| JP | 2002-040247 A | 2/2002 |
|---|---|---|
| JP | 2006-039024 A | 2/2006 |
| JP | 2014-044390 A | 3/2014 |
| JP | 2016-027397 A | 2/2016 |

OTHER PUBLICATIONS

International Search Report issued in PCT/JP2017/003883 dated Apr. 4, 2017.
Written Opinion issued in PCT/JP2017/003883 dated Apr. 4, 2017.
International Preliminary Report on Patentability completed by WIPO dated Sep. 25, 2018, in connection with International Patent Application No. PCT/JP2017/003883.

* cited by examiner

*Primary Examiner* — Sophie Hon
(74) *Attorney, Agent, or Firm* — Edwards Neils LLC; Jean C. Edwards, Esq.

(57) ABSTRACT

A liquid crystal display device includes a liquid crystal panel including at least a liquid crystal cell and a polarizing plate; and a backlight including at least a light source, in which the polarizing plate includes a polarizer and at least one sheet of protective film, the protective film included in the polarizing plate is positioned closest to the backlight side in the liquid crystal panel, and the protective film positioned closest to the backlight side in the liquid crystal panel is an organic solvent-soluble resin film in which an apparent shear strength measured at a surface on the backlight side is 106 MPa or greater and an apparent shear strength measured at a surface on the polarizer side is 101 MPa or less.

11 Claims, No Drawings

LIQUID CRYSTAL DISPLAY DEVICE

CROSS-REFERENCE TO RELATED APPLICATIONS

This application is a Continuation of PCT International Application No. PCT/JP2017/003883 filed on Feb. 3, 2017, which was published under PCT Article 21(2) in Japanese, and which claims priority under 35 U.S.C § 119(a) to Japanese Patent Application No. 2016-057949 filed on Mar. 23, 2016. The above applications are hereby expressly incorporated by reference, in their entirety, into the present application.

BACKGROUND OF THE INVENTION

1. Field of the Invention

The present invention relates to a liquid crystal display device.

2. Description of the Related Art

In a liquid crystal display device, a protective film is typically laminated on one or both surfaces of a polarizer as a protective film (hereinafter, also referred to as a "polarizing plate protective film") for protecting a polarizer (for example, see paragraph 0003 in JP2002-40247A).

SUMMARY OF THE INVENTION

More specifically, the configuration of a liquid crystal display device is as follows. The liquid crystal panel includes a liquid crystal cell and a polarizing plate. The polarizing plate includes at least a polarizer. As described above, a protective film (also referred to as a "polarizing plate protective film") is typically laminated on one or both surfaces of the polarizer. In the liquid crystal display device, typically, the liquid crystal panel incorporating the liquid crystal cell and the polarizing plate and the backlight including a light source and various members are disposed through a clearance (also referred to as a gap or an air layer).

In order to provide a liquid crystal display device with excellent display performance, it is desirable that both points described below are satisfied.

(1) The outermost surface of a liquid crystal panel on a backlight unit side is unlikely to be damaged even in a case where the surface comes into partial contact with the backlight unit.

(2) Occurrence of cracks at the time of cutting a polarizing plate included in a liquid crystal panel can be suppressed.

More specifically, the above-described items (1) and (2) are as follows.

In regard to the item (1), in recent years, the clearance between a liquid crystal panel and a backlight unit tends to be narrowed in order to reduce the thickness of a liquid crystal display device. By narrowing this clearance, the outermost surface of the liquid crystal panel on a backlight unit side is likely to be brought into contact with the backlight unit. Further, it is considered that the liquid crystal panel is likely to be deflected due to enlargement and the outermost surface of the liquid crystal panel on the backlight unit side is likely to be brought into contact with the backlight unit. Damage to the outermost surface of the liquid crystal panel on the backlight unit side due to the partial contact of the outermost surface of the liquid crystal panel on the backlight unit side with the backlight unit causes light leakage on a display surface of the liquid crystal display device. In addition, occurrence of such light leakage results in degradation of display performance of the liquid crystal display device. Therefore, it is desirable that the outermost surface of the liquid crystal panel on the backlight unit side is unlikely to be damaged even in a case where the outermost surface is brought into partial contact with the backlight unit in order to provide a liquid crystal display device with excellent display performance.

In regard to the item (2), a polarizing plate serving as a constituent member of a liquid crystal panel is prepared by cutting a laminate obtained by laminating a polarizer and a protective film in most cases. In a case where the laminate of a polarizer and a protective film is cut, cracks may occur in a part (for example, a peripheral edge) of the polarizing plate at the time of cutting. In a case where cracks occur in a part of the polarizing plate, the cracks cause degradation of the display performance of the liquid crystal display device in some cases.

In regard to the item (1), the polarizing plate protective film is a film provided to prevent damage to the polarizer. Based on the examination conducted by the present inventors, it became evident that the item (1) is not necessarily easy to achieve in a liquid crystal display device in which a polarizing plate protective film is positioned closest to a backlight unit side in a liquid crystal panel. Further, it became evident that it is difficult to achieve both items (1) and (2) in such a liquid crystal display device.

An object of the present invention is to provide a liquid crystal display device in which a polarizing plate protective film is positioned closest to a backlight side in a liquid crystal panel, the polarizing plate protective film is unlikely to be damaged due to partial contact with the backlight, and a polarizing plate that includes the polarizing plate protective film is a polarizing plate in which occurrence of cracks caused by cutting is suppressed.

As the result of intensive examination repeatedly conducted by the present inventors in order to achieve the above-described object, it was found that the following liquid crystal display device is a liquid crystal display device including: a liquid crystal panel which includes at least a liquid crystal cell and a polarizing plate; and a backlight which includes at least a light source, in which the polarizing plate includes a polarizer and at least one sheet of protective film, the protective film included in the polarizing plate is positioned closest to the backlight side in the liquid crystal panel, and the protective film positioned closest to the backlight side in the liquid crystal panel is an organic solvent-soluble resin film in which an apparent shear strength measured at a surface on the backlight side is 106 MPa or greater and an apparent shear strength measured at a surface on the polarizer side is 101 MPa or less. The speculation of the present inventors on such a liquid crystal display device will be described below.

The "organic solvent-soluble resin film" in the present invention and the present specification indicates a single layer film or a film having a laminated structure with two or more layers containing an organic solvent-soluble resin as a constituent component and also indicates at least a film in which a component occupying the most part of a surface area on one surface side and a surface area on the other surface side is an organic solvent-soluble resin.

In the present invention and the present specification, the "organic solvent-soluble resin" indicates a resin exhibiting solubility in an organic solvent. The "solubility in an organic solvent" indicates that 1% by mass or greater of a material is dissolved in an organic solvent at a liquid temperature of 25° C. The organic solvent here is a composition obtained by mixing one or plural kinds selected from the group consisting of organic compounds respectively having 1 to 8 carbon atoms at an optional mixing ratio and is in a liquid state at 25° C. and 1 atm. Specific examples thereof include aliphatic hydrocarbons such as pentane, hexane, cyclohexane, octane, and isooctane; aromatic hydrocarbons such as benzene, toluene, and xylene; alcohols such as methanol, ethanol, 1-propanol, 2-propanol, 1-butanol, 2-butanol, 2-methyl-1-propanol, 2-methyl-2-propanol, 1-hexanol, cyclohexanol, 1-octanol, and ethylene glycol; ketones such as acetone, methyl ethyl ketone, methyl isobutyl ketone, and cyclohexanone; esters such as methyl acetate, ethyl acetate, butyl acetate, ethyl propionate, and propylene glycol monomethyl ether acetate (PGMEA); ethers such as diethyl ether, tetrahydrofuran, and dioxane; halogenated alkyls such as dichloromethane, chloroform, and 1,2-dichloroethane; and compositions obtained by mixing these at optional ratios. Further, the solvent which can be used for forming the organic solvent-soluble resin film is not limited to the above-described organic solvents.

Further, the "surface area" of the organic solvent-soluble resin film is a region from the surface to a portion inside the film at a depth of 3 μm in the film thickness direction.

The "apparent shear strength" in the present invention and the present specification is a value obtained by performing measurement according to the method described in Section 4 of Chapter 7 in "Control of Adhesion and Adhesiveness in Application and Film Formation and Evaluation thereof" (Technical Information Association (2005), pp. 581 to 603). The apparent shear strength is obtained by trimming a surface area on each surface side of a sample to be measured at a constant speed of a vertical speed of 50 nm/s and a horizontal speed of 500 nm/s using a cutting edge, acquiring the horizontal force applied to the cutting edge and the trimmed sectional area at the time of trimming, and performing calculation based on the acquired horizontal force and trimmed sectional area according to Equation A.

$$\tau = F_H / 2A \cot \Phi \quad \text{(Equation A)}$$

In Equation A, τ represents an apparent shear strength (unit: MPa), $F_H$ represents a horizontal force (unit: N (newton)), A represents a trimmed sectional area (unit: $mm^2$), and Φ is 45°. This value is calculated by apparently regarding the shear angle Φ as 45° and thus is referred to as the apparent shear strength. A cutting edge made of single crystal diamond having an edge width of 0.3 mm and an edge angle of 60° (a rake angle of 20° and a clearance angle of 10°) is used as the cutting edge. The apparent shear strength is acquired by arithmetically averaging values measured at 5 sites randomly selected from the surface to be measured.

The apparent shear speed can be measured using a known measuring device. Examples of the measuring device include a SAICAS-NN type measuring device (manufactured by DAIPLA WINTES CO., LTD.). The apparent shear speed in the example described below is measured by using the SAICAS-NN type measuring device (manufactured by DAIPLA WINTES CO., LTD.) in a constant speed mode (a vertical speed of 50 nm/s and a horizontal speed of 500 nm/s), trimming a region from the surface of a sample to be measured to a portion inside the surface at a depth of 3 μm in the thickness direction using the above-described cutting edge, acquiring the horizontal force and the trimmed sectional area at the time of trimming using the trimming force profile, and performing calculation according to Equation A.

In regard to the liquid crystal display device, the present inventors speculated as follows and the present invention is not limited thereto. Further, the present specification includes the speculation of the present inventors. The present invention is not limited to such speculation.

In the examination repeatedly conducted by the present inventors, in a liquid crystal display device of the related art, the present inventors focused on the phenomenon in which light leakage occurs due to damage to a polarizing plate protective film as described above and this phenomenon is likely to occur in a case where the polarizing plate protective film is an organic solvent-soluble resin film. Due to this point, it is also considered that a cured layer usually referred to as a hard coat layer is formed on a surface area of the polarizing plate protective film on a backlight side for the purpose of preventing occurrence of damage. Such a cured layer is formed by coating a base film with a polymerizable composition containing a polymerizable compound and curing this polymerizable composition through irradiation with light or heating. However, the present inventors examined that occurrence of damage to the polarizing plate protective film is suppressed by improvement of the performance of the organic solvent-soluble resin film regardless of the cured layer. The present inventors considered that modification referred to as cure shrinkage occurs at the time of curing a cured layer and the number of steps increases because a coating step and a curing step need to be performed for forming a cured layer. Further, in such a cured layer, a component occupying the most part of the surface area is not an organic solvent-soluble resin but typically a polymer of a polymerizable compound contained in a polymerizable composition.

As the result of intensive examination repeatedly conducted by the present invention, it was newly found that both of the items (1) and (2) can be achieved by disposing an organic solvent-soluble resin film in which an apparent shear strength measured at one surface is 106 MPa or greater and an apparent shear strength measured at the other surface is 101 MPa or less such that the surface having an apparent shear strength of 106 MPa or greater is positioned on a backlight side and the surface having an apparent shear strength of 101 MPa or less is positioned on a polarizer side. The present inventors considered that the apparent shear strength measured at the surface of the organic solvent-soluble resin film on the backlight side is set to 106 MPa or greater because the partial contact between the backlight and the outermost surface of the liquid crystal panel on the backlight side is not a mere point contact. Further, the present inventors speculated that the apparent shear strength measured according to the above-described method is not an index simply indicating being hard but a value which can be used as an index of force against such contact. Further, the present inventors considered that the apparent shear strength measured at the surface of the organic solvent-soluble resin film on the polarizer side is set to 101 MPa or less because occurrence of cracks due to the force applied to the vicinity of the surface of the organic solvent-soluble resin film on the polarizer side at the time of cutting can be prevented.

However, the present invention is not limited to the speculation of the present inventors.

According to an aspect, the organic solvent-soluble resin film contains a urethane bond-containing compound.

According to the aspect, the urethane bond-containing compound has a partial structure represented by Formula 1.

Formula 1

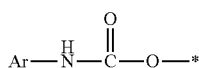

(In Formula 1, Ar represents an aryl group, and the symbol "*" represents a bonding position with respect to another partial structure constituting the urethane bond-containing compound.)

According to the aspect, the aryl group represented by Ar in Formula 1 is a phenyl group.

According to the aspect, the urethane bond-containing compound has two to four partial structures represented by Formula 1 in one molecule.

According to the aspect, the urethane bond-containing compound has two or three partial structures represented by Formula 1 in one molecule.

According to the aspect, the content of the urethane bond-containing compound in the organic solvent-soluble resin film is 20 parts by mass or greater with respect to 100 parts by mass of the organic solvent-soluble resin in a surface area on the backlight side and 12 parts by mass or less with respect to 100 parts by mass of the organic solvent-soluble resin in a surface area on the polarizer side.

The above-described content is a value acquired with respect to 100 parts by mass of the content of the organic solvent-soluble resin in the surface area and can be measured according to a known method. As the measuring method, the following methods (i) and (ii) can be exemplified. Further, the content can be acquired based on production conditions. For example, the content with respect to 100 parts by mass of the content of the organic solvent-soluble resin in the composition used for forming a layer that includes the surface area can be regarded as the content of the urethane bond-containing compound with respect to 100 parts by mass of the organic solvent-soluble resin in the surface area.

(i) The absorption spectrum in a surface of a sample to be measured is measured according to attenuated total reflection-infrared spectroscopy (ATR-IR). The amount of a compound to be measured (the urethane bond-containing compound and the organic solvent-soluble resin) is quantified based on the intensity ratio between the intensity of the absorption peak derived from the compound to be measured in the obtained absorption spectrum and the intensity of the absorption peak separately obtained from measurement on a standard sample whose addition amount is known. In consideration of the spatial resolution of the infrared spectroscopy, the composition of the surface area can be analyzed by the measurement performed on the surface.

(ii) A surface area of a sample to be measured is trimmed, and a compound to be measured (the urethane bond-containing compound and the organic solvent-soluble resin) is extracted using an extraction solvent extracted from the obtained trimmed piece. The extraction solvent can be appropriately selected without limitation as long as the solvent is capable of dissolving the compound to be measured. An extraction liquid obtained by extraction is measured using high performance liquid chromatography (HPLC) and an ultraviolet and visible spectrophotometer to acquire the intensity of the absorption peak derived from the compound to be measured. Measurement is separately performed on a standard sample of a compound to acquire the absorption peak intensity based on the known amount of this compound. The amount of the compound to be measured is quantified based on the intensity ratio between the intensities obtained in the above-described manner.

According to the aspect, the content of the urethane bond-containing compound in the organic solvent-soluble resin film is 30 parts by mass or greater with respect to 100 parts by mass of the organic solvent-soluble resin in the surface area on the backlight side.

According to the aspect, the liquid crystal panel includes a front-side polarizing plate, a liquid crystal cell, and a rear-side polarizing plate, and the rear-side polarizing plate is a polarizing plate including the organic solvent-soluble resin film.

According to the aspect, the organic solvent-soluble resin film is a cellulose acylate film.

According to the aspect, a degree of substitution of cellulose acylate contained in the surface area of the cellulose acylate film on the backlight side is in a range of 2.20 to 2.60.

The degree of substitution of cellulose acylate indicates the ratio of acylation of three hydroxyl groups present in a constitutional unit of cellulose ((β)1,4-glycoside-bonded glucose). The degree of substitution (acylation degree) can be calculated by measuring the amount of bonded fatty acid per the mass of the constitutional unit of cellulose. The degree of substitution of cellulose acylate can be calculated by dissolving cellulose acylate in a solvent such as deuterium-substituted dimethyl sulfoxide to measure the 13C-NMR (nuclear magnetic resonance) spectrum and acquiring the peak intensity ratio of carbonyl carbon in an acyl group. Specifically, the degree can be acquired by the 13C-NMR measurement after remaining hydroxyl groups in cellulose acylate is substituted with other acyl groups different from the acyl groups included in the cellulose acylate. The details of the measuring method are described in (Carbohydrate. Res., 273(1995) 83 to 91) written by Tezuka et al.

According to the aspect, a diffusion member is positioned closest to the liquid crystal panel side in the backlight unit. The "diffusion member" in the present invention and the present specification, the "diffusion member" indicates a member having a haze in a range of 50% to 100%. The haze indicates a value to be measured in conformity with JIS K 7136 (2000) using a haze meter in an environment of a temperature of 25° C. and a relative humidity of 60%. As the haze meter, for example, a Suga tester HGM-2DP can be used. As the diffusion member, a sheet-like member (diffusion sheet) is preferable. Further, in the present invention and the present specification, the term sheet has the same definition as the term film.

According to the present invention, it is possible to provide a liquid crystal display device in which a polarizing plate protective film is positioned closest to a backlight unit side in a liquid crystal panel, the polarizing plate protective film is unlikely to be damaged due to partial contact with the backlight unit, and a polarizing plate that includes the polarizing plate protective film is a polarizing plate in which occurrence of cracks caused by cutting is suppressed.

DESCRIPTION OF THE PREFERRED EMBODIMENTS

The description below is made based on representative embodiments of the present invention. However, the present invention is not limited to such embodiments. The numerical ranges shown using "to" in the present invention and the present specification indicate ranges including the numerical values described before and after "to" as the lower limits and the upper limits.

In the present invention and the present specification, a certain component may be contained in a film, a composition, or the like in a manner in which only one component is contained or an optional combination of two or more kinds at an optional mixing ratio may be contained, unless otherwise specified. Further, the content and the content ratio of a certain component in a film, a composition, and the like indicate the total content and the total content ratio of two or more components in a case where two or more components are contained, unless otherwise specified.

A liquid crystal display device of the present invention includes a liquid crystal panel including at least a liquid crystal cell and a polarizing plate; and a backlight including at least a light source, in which the polarizing plate includes a polarizer and at least one sheet of protective film, the protective film included in the polarizing plate is positioned closest to the backlight side in the liquid crystal panel, and the protective film (hereinafter, also referred to as a "most BL (backlight) side protective film) positioned closest to the backlight side in the liquid crystal panel is an organic solvent-soluble resin film in which an apparent shear strength measured at a surface (hereinafter, also referred to as a "BL side surface") on the backlight side is 106 MPa or greater and an apparent shear strength measured at a surface (hereinafter, also referred to as a "polarizer side surface") on the polarizer side is 101 MPa or less.

Hereinafter, the above-described liquid crystal display device will be described in more detail.

[Liquid Crystal Panel]

<Polarizing Plate>

The liquid crystal panel includes at least a liquid crystal cell and at least one sheet of polarizing plate. The polarizing plate includes at least one sheet of protective film (polarizing plate protective film), and the protective film included in the polarizing plate is positioned closest to the backlight side in the liquid crystal panel. In other words, a member positioned closest to the backlight unit side in the liquid crystal panel is the polarizing plate including the protective film. In addition, the protective film is an organic solvent-soluble resin film in which the apparent shear strength measured at a surface on the backlight side is 106 MPa or greater and the apparent shear strength measured at a surface on the polarizer side is 101 MPa or less.

The liquid crystal panel includes, as a polarizing plate, at least the above-described polarizing plate serving as a member positioned closest to the backlight unit side. According to an aspect, the liquid crystal panel includes two sheets of polarizing plates. According to a preferred aspect, the liquid crystal panel includes a front-side polarizing plate, a liquid crystal cell, and a rear-side polarizing plate in this order from a viewing side to the backlight unit side. In the liquid crystal panel, the "front-side polarizing plate" is a polarizing plate positioned on the viewing side between the above-described two sheets of polarizing plates. The "rear-side polarizing plate" is a polarizing plate positioned on the backlight unit side.

The polarizing plate serving as a member positioned closest to the backlight unit side in the liquid crystal panel includes at least one sheet of protective film. Another polarizing plate optionally included may include at least one sheet of protective film. A polarizing plate having a configuration in which a polarizer is positioned between two sheets of protective films is currently and widely used as a polarizing plate. According to the aspect, the polarizing plate included in the liquid crystal display device can be set as a polarizing plate having such a configuration. Between two sheets of polarizing plate protective films included in the polarizing plates, the protective film positioned on the liquid crystal cell side is referred to as an inner protective film and the other protective film is referred to as an outer protective film. The liquid crystal panel includes a front-side polarizing plate, a liquid crystal cell, and a rear-side polarizing plate, and the rear-side polarizing plate is a member positioned closest to the backlight unit side in the liquid crystal panel. In a case where the rear-side polarizing plate is a polarizing plate having a configuration in which a polarizer is positioned between two sheets of protective films, the outer protective film surface of the rear-side polarizing plate becomes the outermost surface of the liquid crystal panel on the backlight unit side. According to the aspect, the organic solvent-soluble resin film is an outer protective film of the rear-side polarizing plate.

<<Most BL Side Protective Film>>

(Apparent Shear Strength Measured at Surface on BL Side)

In the most BL side protective film included in the polarizing plate that is included as a member of the liquid crystal panel closest to the backlight unit side, the apparent shear strength measured at the surface on the backlight unit side (the surface on the BL side) is 106 MPa or greater. The present inventors speculated that this result contributes to the unlikeliness of occurrence of damage to the surface even in a case where the most BL side protective film is brought into partial contact with the backlight unit. Occurrence of light leakage on the display surface of the liquid crystal display device can be suppressed by suppressing the occurrence of damage to the surface. From the viewpoint of further suppressing the occurrence of damage, the apparent shear strength measured at the surface on the BL side is preferably 108 MPa or greater, more preferably 110 MPa or greater, still more preferably 115 MPa or greater, and even still more preferably 116 MPa or greater. The apparent shear strength measured at the surface on the BL side can be set to 130 MPa or less, 125 MPa or less, or 120 MPa or less. However, from the viewpoint of suppressing the occurrence of damage, it is preferable that the apparent shear strength measured at the surface on the BL side is increased, and thus the apparent shear strength is not limited to the upper limit described above.

(Apparent Shear Strength Measured at Surface on Polarizer Side)

In the most BL side protective film included in the polarizing plate which is included as a member of the liquid crystal panel closest to the backlight side, the apparent shear strength measured at the surface on the polarizer side (the surface on the polarizer side) is 101 MPa or less. The present inventors speculated that this result contributes to suppression of occurrence of cracks at the time of cutting the polarizing plate including the most BL side protective film. From the viewpoint of further suppressing occurrence of cracks at the time of cutting the polarizing plate, the apparent shear strength measured at the surface on the polarizer side is preferably 100 MPa or less, more preferably 95 MPa or less, still more preferably 93 MPa or less, even still more preferably 91 MPa or less, even still more preferably 84 MPa or less, and even still more preferably 81 MPa or less. From the viewpoint of self-supporting properties, the apparent shear strength measured at the surface on the polarizer side can be set to be in a range of, for example, 60 MPa to 70 MPa. However, from the viewpoint of suppressing the occurrence of cracks at the time of cutting the polarizing plate, it is preferable that the apparent shear strength measured at the surface on the polarizer side is decreased, and thus the apparent shear strength may be lower than the lower limit described above.

The apparent shear strength can be controlled by the kind of component constituting the most BL side protective film and/or the content of each component. In regard to this point, the present inventors examined that the apparent shear strength tends to be increased in a case where the most BL side protective film contains a compound having a hydrogen bonding property. Accordingly, by allowing the compound having a hydrogen bonding property to be contained in at least a part of a region of the most BL side protective film from the surface on the BL side toward the film thickness direction, the apparent shear strength measured at the surface on the BL side can be increased as the content of the compound is larger. Further, in a case where a compound having a hydrogen bonding property is not added to a part of a region of the most BL side protective film from the surface on the polarizer side toward the film thickness direction or the content of the compound is reduced, the apparent shear strength measured at the surface on the polarizer side can be decreased. As a method of obtaining a film in which the kind and/or the content of the component to be contained in a part of a region from one surface toward the film thickness direction and the kind and/or the content of the component to be contained in a part of a region from the other surface toward the film thickness direction are different from each other, a known film forming method such as a co-casting method, which enables production of a resin film having a laminated structure formed by laminating two or more layers with different compositions can be used. The details will be described below. Further, the hydrogen bonding property indicates a property that enables formation of a hydrogen bond between molecules and/or a molecule. Preferred examples of the compound having the hydrogen bonding property include a urethane bond-containing compound. The urethane bond-containing compound will be described in detail.

Next, various components capable of constituting the most BL side protective film will be described.

(Urethane Bond-Containing Compound)

As described above, it is preferable that the most BL side protective film contains a compound having the hydrogen bonding property in at least a part of a region from the surface on the BL side toward the film thickness direction and more preferable that a larger amount of the compound having the hydrogen bonding property is contained (unevenly distributed) in a part of a region from the surface on the BL side toward the film thickness direction than the amount of the compound contained in a part of a region from the surface on the polarizer side toward the film thickness direction. As a preferred aspect of the compound having the hydrogen bonding property, a urethane bond-containing compound can be exemplified. The urethane bond-containing compound is a compound having one or more urethane bonds (—NH—C(=O)—O) in one molecule. The number of urethane bonds contained in one molecule of the urethane bond-containing compound is preferably 2 or more, more preferably 2 to 4, and still more preferably 2 or 3.

From the viewpoint of increasing the value of the apparent shear strength measured at the surface on the BL side, it is preferable that the urethane bond-containing compound has a cyclic structure in a molecule. Examples of the cyclic structure include an aromatic ring and an aliphatic ring, and a carbocycle or a heterocycle may be used. Further, the cyclic structure may be a monocycle or a fused ring. In addition, the cyclic structure may be a ring aggregate having one or more structures formed by linking monocycles, fused rings, or a monocycle and a fused ring to each other through a single bond. As the cyclic structure included the urethane bond-containing compound, an aromatic ring is preferable and an aromatic carbocycle is more preferable.

From the viewpoint of increasing the apparent shear strength measured at the surface on the BL side, preferred examples of the urethane bond-containing compound include a compound having a partial structure formed by a cyclic structure being directly bonded to a urethane bond. More preferred examples of the urethane bond-containing compound include a compound having a partial structure formed by a cyclic structure being directly bonded to a nitrogen atom of a urethane bond.

Preferred examples of the urethane bond-containing compound having the partial structure include a urethane bond-containing compound having a partial structure represented by Formula 1.

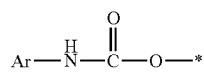

Formula 1

In Formula 1, Ar represents an aryl group, and the symbol "*" represents a bonding position with respect to another partial structure constituting the urethane bond-containing compound. The aryl group is a monovalent functional group formed by one hydrogen atom being released from an aromatic hydrocarbon. In Formula 1, the aryl group represented by Ar may be a substituted aryl group or an unsubstituted aryl group. Between these, an unsubstituted aryl group is preferable. In a case where the aryl group has a substituent, examples of the substituent include one or more substituents from among the following substituent group T exemplified below. In the present invention and the present specification, a group in the description may have a substituent or may be unsubstituted unless otherwise specified. In a case where a group has a substituent, examples of the substituent include one or more substituents from among the following substituent group T exemplified below. Further, the number of carbon atoms in a certain group indicates the number of carbon atoms including the number of carbon atoms in a substituent in a case where the group has a substituent.

Examples of the substituent group T include: an alkyl group (the number of carbon atoms of the alkyl group is preferably in a range of 1 to 20, more preferably in a range of 1 to 12, and particularly preferably in a range of 1 to 8, and examples thereof include a methyl group, an ethyl group, an iso-propyl group, a tert-butyl group, an n-octyl group, an n-decyl group, an n-hexadecyl group, a cyclopropyl group, a cyclopentyl group, and a cyclohexyl group), an alkenyl group (the number of carbon atoms of the alkenyl group is preferably in a range of 2 to 20, more preferably in a range of 2 to 12, and particularly preferably in a range of 2 to 8, and examples thereof include a vinyl group, an allyl group, a 2-butenyl group, and a 3-pentenyl group), an alkynyl group (the number of carbon atoms of the alkynyl group is preferably in a range of 2 to 20, more preferably in a range of 2 to 12, and particularly preferably in a range of 2 to 8, and examples thereof include a propargyl group and a 3-pentynyl group), an aryl group (the number of carbon atoms of the aryl group is preferably in a range of 6 to 30, more preferably in a range of 6 to 20, and particularly preferably in a range of 6 to 12, and examples thereof include a phenyl group, a biphenyl group, and a naphthyl group), an amino group (the number of carbon atoms of the amino group is preferably in a range of 0 to 20, more preferably in a range of 0 to 10, and particularly preferably in a range of 0 to 6, and examples thereof include an amino group, a methylamino group, a dimethylamino group, a diethylamino group, and a dibenzylamino group), an alkoxy group (the number of carbon atoms of the alkoxy group is preferably in a range of 1 to 20, more preferably in a range of 1 to 12, and particularly preferably in a range of 1 to 8, and examples thereof include a methoxy group, an ethoxy group, and a butoxy group), an aryloxy group (the number of carbon atoms of the aryloxy group is preferably in a range of 6 to 20, more preferably in a range of 6 to 16, and particularly preferably in a range of 6 to 12, and examples thereof include a phenyloxy group and a 2-naphthyloxy group), an acyl group (the number of carbon atoms of the acyl group is preferably in a range of 1 to 20, more preferably in a range of 1 to 16, and particularly preferably in a range of 1 to 12, and examples thereof include an acetyl group, a benzoyl group, a formyl group, and a pivaloyl group), an alkoxycarbonyl group (the number of carbon atoms of the alkoxycarbonyl group is preferably in a range of 2 to 20, more preferably in a range of 2 to 16, and particularly preferably in a range of 2 to 12, and examples thereof include a methoxycarbonyl group and an ethoxycarbonyl group), an aryloxycarbonyl group (the number of carbon atoms of the aryloxycarbonyl group is preferably in a range of 7 to 20, more preferably in a range of 7 to 16, and particularly preferably in a range of 7 to 10, and examples thereof include a phenyloxycarbonyl group), an acyloxy group (the number of carbon atoms of the acyloxy group is preferably in a range of 2 to 20, more preferably in a range of 2 to 16, and particularly preferably in a range of 2 to 10, and examples thereof include an acetoxy group and a benzoyloxy group), an acylamino group (the number of carbon atoms of the acylamino group is preferably in a range of 2 to 20, more preferably in a range of 2 to 16, and particularly preferably in a range of 2 to 10, and examples thereof include an acetylamino group and a benzoylamino group), an alkoxycarbonylamino group (the number of carbon atoms of the alkoxycarbonylamino group is preferably in a range of 2 to 20, more preferably in a range of 2 to 16, and particularly preferably in a range of 2 to 12, and examples thereof include a methoxycarbonylamino group), an aryloxycarbonylamino group (the number of carbon atoms of the aryloxycarbonylamino group is preferably in a range of 7 to 20, more preferably in a range of 7 to 16, and particularly preferably in a range of 7 to 12, and examples thereof include a phenyloxycarbonylamino group), a sulfonylamino group (the number of carbon atoms of the sulfonylamino group is preferably in a range of 1 to 20, more preferably in a range of 1 to 16, and particularly preferably in a range of 1 to 12, and examples thereof include a methanesulfonylamino group and a benzenesulfonylamino group), a sulfamoyl group (the number of carbon atoms of the sulfamoyl group is preferably in a range of 0 to 20, more preferably in a range of 0 to 16, and particularly preferably in a range of 0 to 12, and examples thereof include a sulfamoyl group, a methylsulfamoyl group, a dimethylsulfamoyl group, and a phenylsulfamoyl group), a carbamoyl group (the number of carbon atoms of the carbamoyl group is preferably in a range of 1 to 20, more preferably in a range of 1 to 16, and particularly preferably in a range of 1 to 12, and examples thereof include a carbamoyl group, a methyl carbamoyl group, a diethyl carbamoyl group, and a phenyl carbamoyl group), an alkylthio group (the number of carbon atoms of the alkylthio group is preferably in a range of 1 to 20, more preferably in a range of 1 to 16, and particularly preferably in a range of 1 to 12, and examples thereof include a methylthio group and an ethylthio group), an arylthio group (the number of carbon atoms of the arylthio group is preferably in a range of 6 to 20, more preferably in a range of 6 to 16, and particularly preferably in a range of 6 to 12, and examples thereof include a phenylthio group), a sulfonyl group (the number of carbon atoms of the sulfonyl group is preferably in a range of 1 to 20, more preferably in a range of 1 to 16, and particularly preferably in a range of 1 to 12, and examples thereof include a mesyl group and a tosyl group), a sulfinyl group (the number of carbon atoms of the sulfinyl group is preferably in a range of 1 to 20, more preferably in a range of 1 to 16, and particularly preferably in a range of 1 to 12, and examples thereof include a methanesulfinyl group and a benzenesulfinyl group), a urethane group, an ureido group (the number of carbon atoms of the ureido group is preferably in a range of 1 to 20, more preferably in a range of 1 to 16, and particularly preferably in a range of 1 to 12, and examples thereof include an ureido group, a methylureido group, and a phenylureido group), a phosphoric acid amide group (the number of carbon atoms of the phosphoric acid amide group is preferably in a range of 1 to 20, more preferably in a range of 1 to 16, and particularly preferably in a range of 1 to 12, and examples thereof include diethyl phosphoric acid amide and phenyl phosphoric acid amide), a hydroxyl group, a mercapto group, a halogen atom (such as a fluorine atom, a chlorine atom, a bromine atom, or an iodine atom), a cyano group, a sulfo group, a carboxyl group, a nitro group, a hydroxamic acid group, a sulfino group, a hydrazino group, an imino group, a heterocyclic group (the number of carbon atoms of the heterocyclic group is preferably in a range of 1 to 30 and more preferably in a range of 1 to 12, examples of a heteroatom include a nitrogen atom, an oxygen atom, and a sulfur atom, and specific examples thereof include an imidazolyl group, a pyridyl group, a quinolyl group, a furyl group, a piperidyl group, a morpholino group, a benzoxazolyl group, a benzimidazolyl group, and a benzothiazolyl group), a silyl group (the number of carbon atoms of the silyl group is preferably in a range of 3 to 40, more preferably in a range of 3 to 30, and particularly preferably in a range of 3 to 24, and examples thereof include a trimethylsilyl group and a triphenylsilyl group).

These substituent groups may be further substituted. Further, in a case where a plurality of substituents are present, two or more substituents may be the same as or different from each other. Further, the substituents may be linked to each other to form a ring if possible.

The number of carbon atoms of the aryl group represented by Ar in Formula 1 is preferably in a range of 6 to 30, more preferably in a range of 6 to 20, and still more preferably in a range of 6 to 12. Specific examples thereof include a phenyl group, a biphenyl group, and a naphthyl group. It is particularly preferable that Ar in Formula 1 represents a phenyl group. The number of partial structures represented by Formula 1 which are contained in one molecule of the urethane bond-containing compound is preferably 2 or more, more preferably in a range of 2 to 4, and still more preferably 2 or 3. In a case where two or more partial structures represented by Formula 1 are contained in one molecule of the urethane bond-containing compound, Ar's in two or more partial structures represented by Formula 1 may be the same as or different from one another. In two or more partial structures represented by Formula 1, it is preferable that one or more Ar's represent a phenyl group, more preferable that more Ar's represent a phenyl group, and particularly preferable that all Ar's represent a phenyl group.

In the urethane bond-containing compound, structures other than the partial structure having a urethane bond are not particularly limited. For example, the compound having two or more partial structures having a urethane bond in one molecule may have one or a combination of two or more groups selected from the group consisting of an alkylene group, —O—, —C(=O)—, —NR$^1$—, —S—, and an arylene group, as a divalent linking group that links partial structures having a urethane bond. The alkylene group may be linear, branched, or cyclic. The alkylene group may be an alkylene group formed by one or more cyclic alkylene groups (cycloalkylene groups) being linked to one or more linear or branched alkylene groups. Specific examples of the linear or branched alkylene group include a methylene group, an ethylene group, a propylene group, a butylene group, a pentylene group, and a hexylene group. As the linear or branched alkylene group, an alkylene group having 1 to 20 carbon atoms is preferable, an alkylene group having 1 to 12 carbon atoms is more preferable, an alkylene group having 1 to 8 carbon atoms is still more preferable, an alkylene group having 1 to 3 carbon atoms is even still more preferable, and a methylene group, an ethylene group, or a propylene group is even still more preferable. As the cyclic alkylene group, a cyclohexylene group which may have a substituent is preferable. The alkylene group may have a substituent. Examples of the substituent which may be included in the alkylene group include one or more substituents from among the substituent group T. Among these, an alkyl group, an acyl group, an aryl group, or an alkoxy group is preferable as the substituent included in the alkylene group.

Further, R$^1$ in —NR$^1$— represents a hydrogen atom or a substituent, and examples of the substituent include an alkyl group, an alkenyl group, an alkynyl group, an aryl group, and an acyl group. R$^1$ represents preferably a hydrogen atom, an alkyl group having 1 to 8 carbon atoms, an alkenyl group having 2 to 8 carbon atoms, an alkynyl group having 2 to 8 carbon atoms, or an aryl group having 6 to 18 carbon atoms and more preferably a hydrogen atom or an alkyl group having 1 to 4 carbon atoms.

As the arylene group, an arylene group having 6 to 18 carbon atoms and a phenylene group is more preferable.

The molecular weight of the urethane bond-containing compound is preferably in a range of 230 to 2000, more preferably in a range of 250 to 1500, still more preferably in a range of 300 to 1000, and even still more preferably in a range of 350 to 800.

Specific examples of the above-described urethane bond-containing compound include the following compounds. However, the urethane bond-containing compound which can be used in the present invention is not limited to the following exemplary compounds.

Compound A

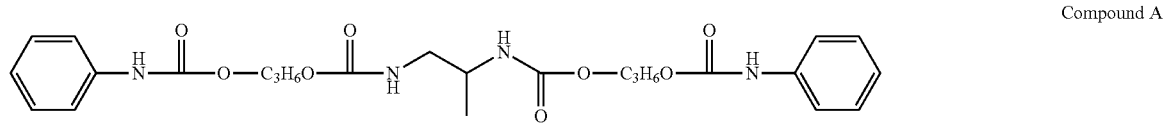

Compound B

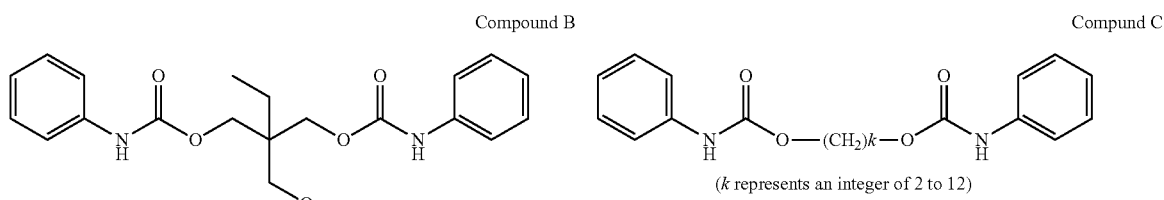

Compund C

($k$ represents an integer of 2 to 12)

Compund D

Compund E

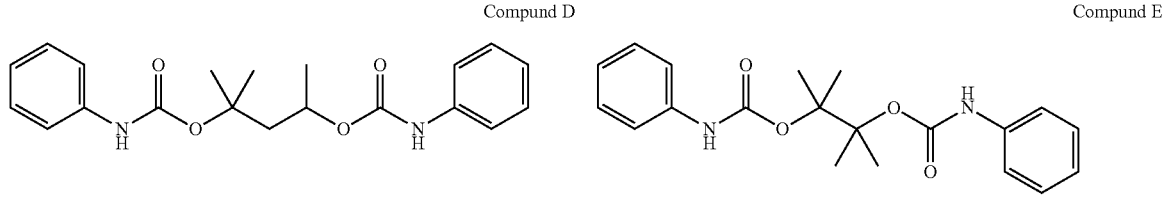

Compund F

Compound G

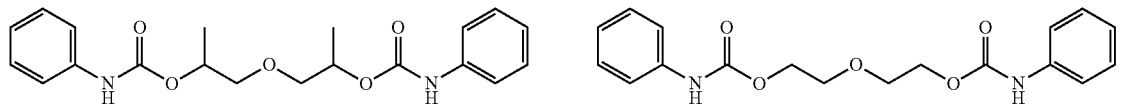

-continued
Compound H
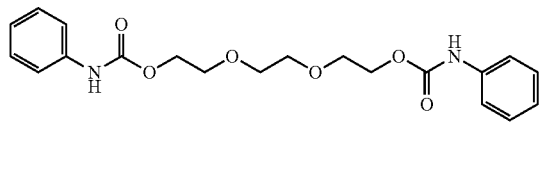
Compound I
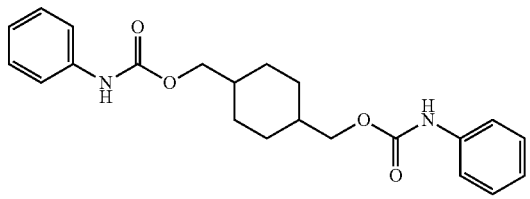
Compound J
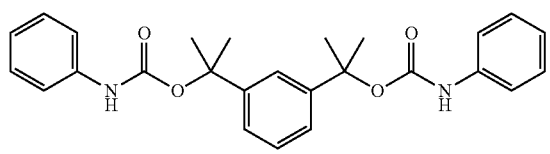
Compound K
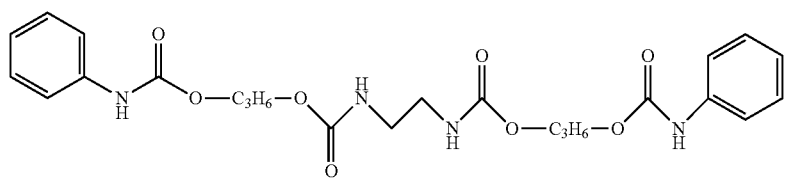
Compound L
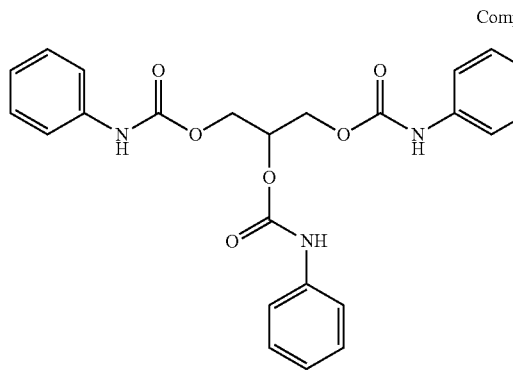
Compound M
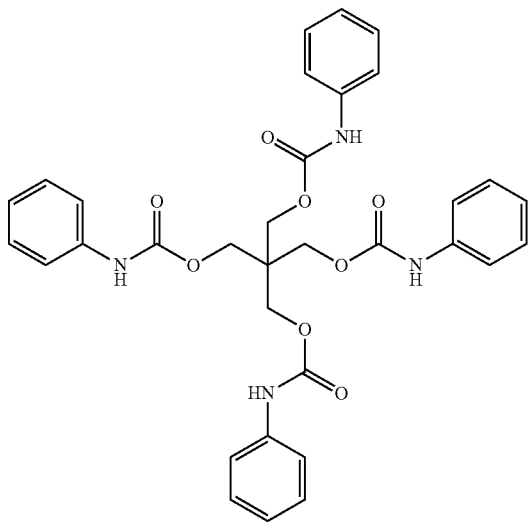
Compound N
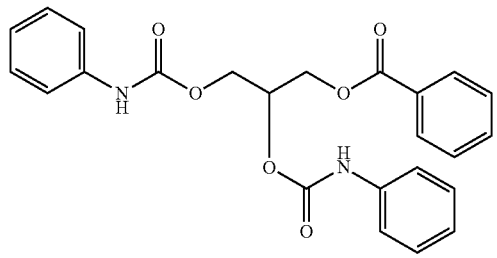
Compound O
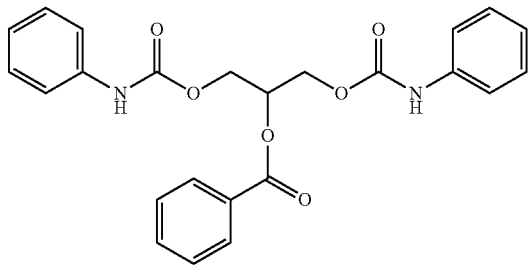

Compound P

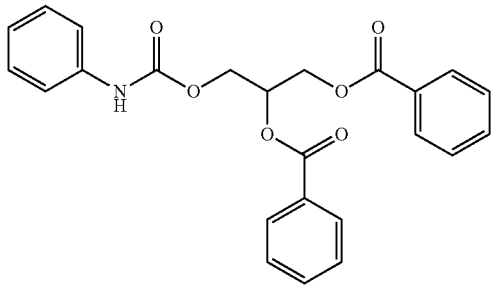

Compound Q

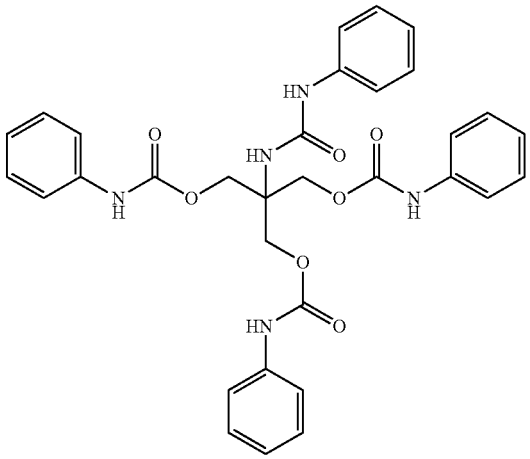

Compound R

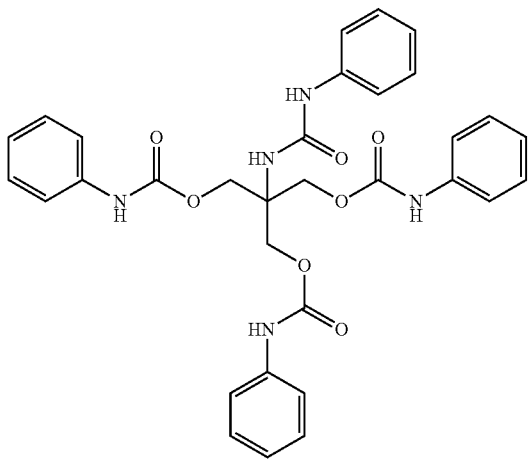

Compound S

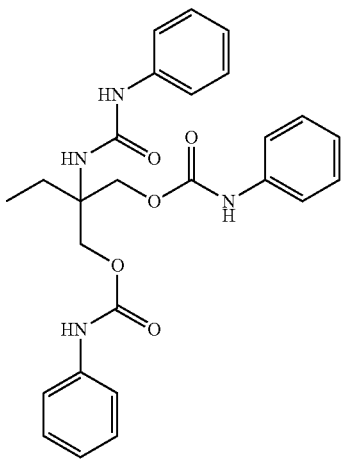

Compound T

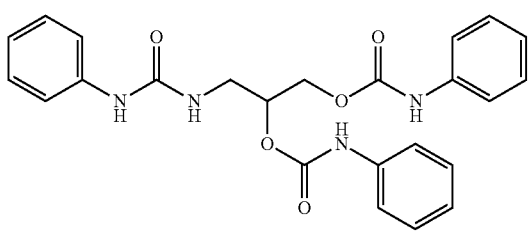

The urethane bond-containing compound can be synthesized according to a known synthetic method. For example, the compound can be obtained by carrying out an addition reaction of an amine to alkyl or arylisocyanate. At the time of the addition reaction of an amine to alkyl or arylisocyanate, it is also preferable to use a catalyst. As the catalyst, known urethanization catalysts of the related art such as amines, metal organic acid salts or metal chelate compounds such as zinc and tin, and organic metal compounds such as zinc, tin, and bismuth can be used. As a urethanization catalyst, for example, dibutyl tin dilaurate or dibutyl tin diacetate is preferably used.

It is preferable that the urethane bond-containing compound is unevenly distributed in a part of a region of the most BL side protective film from the surface on the BL side toward the film thickness direction. Specifically, it is preferable that the content of the urethane bond-containing compound in a part of a region from the surface on the BL side toward the film thickness direction is greater than the content of the urethane bond-containing compound in a part of a region from the surface on the polarizer side toward the film thickness direction from the viewpoint that the most BL side protective film in which the apparent shear strength measured at the surface on the BL side is 106 MPa or greater and the apparent shear strength measured at the surface on the polarizer side is 101 MPa or less is obtained. According to a preferred aspect, the content of the urethane bond-containing compound in the most BL side protective film is preferably 20 parts by mass or greater with respect to 100 parts by mass of the organic solvent-soluble resin in the surface area (a region from the surface to a portion inside the film at a depth of 3 μm in the film thickness direction) on the backlight side and is preferably 12 parts by mass or less with respect to 100 parts by mass of the organic solvent-soluble resin in the surface area (a region from the surface to a portion inside the film at a depth of 3 µm in the film thickness direction) on the polarizer side. The method of acquiring the content of the urethane bond-containing compound in the surface area is as described above. The content of the urethane bond-containing compound in a region (hereinafter, referred to as an "intermediate region") between the surface area on the backlight side and the surface area on the polarizer side is not particularly limited. For example, according to the aspect, the content of the urethane bond-containing compound in the intermediate region may be constant from the backlight side to the polarizer side or may be stepwisely or continuously changed (preferably decreased).

The content of the urethane bond-containing compound in the surface area of on the backlight side is more preferably 30 parts by mass or greater, still more preferably 40 parts by mass or greater, and still more preferably 50 parts by mass or greater with respect to 100 parts by mass of the organic solvent-soluble resin. Further, the content of the urethane bond-containing compound in the surface area on the backlight side can be set to 80 parts by mass or less with respect to 100 parts by mass of the organic solvent-soluble resin. However, the present invention is not limited to the above-described upper limit.

The content of the urethane bond-containing compound in the surface area on the polarizer side is preferably 10 parts by mass or less, more preferably 5 parts by mass or less, and still more preferably 3 parts by mass or less with respect to 100 parts by mass of the organic solvent-soluble resin. Further, the content of the urethane bond-containing compound in the surface area on the polarizer side is, for example, 0 parts by mass or greater and may be 1 part by mass or greater with respect to 100 parts by mass of the organic solvent-soluble resin. The content of the urethane bond-containing compound in the surface area on the polarizer side is particularly preferably 0 parts by mass.

As described above, in order to allow the urethane bond-containing compound to be unevenly distributed in a part of a region from the surface on the BL side toward the film thickness direction, it is preferable that the organic solvent-soluble resin film used as the most BL side protective film is produced according to a known film forming method such as a co-casting method, which enables production of a film having a laminated structure formed by laminating two or more layers with different compositions. An organic solvent-soluble resin film in which the urethane bond-containing compound is unevenly distributed in a part of a region (for example, a surface area) from the surface on the BL side to toward the film thickness direction can be obtained by using a composition containing a larger amount of the urethane bond-containing compound than the amount of the composition for film formation used to form a layer having a part of a region from the surface on the polarizer side toward the film thickness direction, as a composition for film formation used to form a layer having a part of a region from the surface on the BL side toward the film thickness direction. The details will be described below.

(Organic Solvent-Soluble Resin)

As the organic solvent-soluble resin contained in the most BL side protective film (organic solvent-soluble resin film), an organic solvent-soluble resin typically used for various optical films such as a polarizing plate protective film can be used without particular limitation. Specific preferred examples of such an organic solvent-soluble resin include cellulose acylate, an acrylic resin, and polyester. In other words, as a preferable organic solvent-soluble resin film, a cellulose acylate film, an acrylic resin film, and a polyester film can be exemplified. Hereinafter, these organic solvent-soluble resins will be further described.

—Cellulose Acylate—

In a case where the most BL side protective film is a cellulose acylate film the cellulose acylate film contains cellulose acylate as a constituent component of the film.

Examples of the cellulose acylate include a cellulose acylate compound and a compound having an acyl-substituted cellulose skeleton obtained by introducing a functional group biologically or chemically using cellulose as a raw material.

The cellulose acylate is an ester of cellulose and an acid. As the acid, an organic acid is preferable, a carboxylic acid is more preferable, a fatty acid having 2 to 22 carbon atoms is still more preferable, and a lower fatty acid having 2 to 4 carbon atoms is most preferable.

Examples of the raw material cellulose of cellulose acylate include cotton linter and wood pulp (hardwood pulp and coniferous pulp). As the cellulose acylate, cellulose acylate obtained from any raw material cellulose may be used or these may be mixed and used in some cases. Details of the raw material cellulose are described in "Plastic Material Course (17) Fiber-based Resin" (written by Maruzawa and Uda, published by NIKKAN KOGYO SHIMBUN, LTD., 1970) and "Japan Institute of Invention and Innovation" 2001 to 1745 (pp. 7 and 8).

The cellulose acylate is obtained by substituting a hydrogen atom in a hydroxyl group of cellulose with an acyl group. The number of carbon atoms of the acyl group is preferably in a range of 2 to 22. The acyl group may be an aliphatic acyl group or an aromatic acyl group and may be substituted with one acyl group or substituted with two or more acyl groups having different structures. Specific examples of the cellulose acylate include alkyl carbonyl ester of cellulose, alkenyl carbonyl ester, aromatic carbonyl ester, and aromatic alkyl carbonyl ester. In these, each of an alkyl moiety, an alkenyl moiety, an aromatic moiety, and an aromatic alkyl moiety may be further substituted with a substituent. Preferred examples of the acyl group include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an i-butanoyl group, a t-butanoyl group, a cyclohexanecarbonyl group, an oleoyl group, a benzoyl group, a naphthylcarbonyl group, and a cinnamoyl group. Among these, an acetyl group, a propionyl group, a butanoyl group, a dodecanoyl group, an octadecanoyl group, a t-butanoyl group, an oleoyl group, a benzoyl group, a naphthylcarbonyl group, and a cinnamoyl group are preferable; an acetyl group, a propionyl group, and a butanoyl group are more preferable; and an acetyl group is most preferable.

The degree of substitution (acylation degree) of cellulose acylate in the cellulose acylate film used as the most BL side protective film is, for example, in a range of 2.00 to 2.95, preferably in a range of 2.00 to 2.85, and still more preferably in a range of 2.20 to 2.85. The degree of substitution of cellulose acylate contained in at least the surface area on the backlight side, in the film containing a compound having the hydrogen bonding property in a part of a region from the surface on the BL side toward the film thickness direction, is preferably in a range of 2.20 to 2.60 and more preferably in a range of 2.20 to 2.50. In a case where the hydroxyl group and the acyl group contained in the cellulose acylate are compared to each other, it is considered that the hydrogen bonding property of the hydroxyl group is stronger than the hydrogen bonding property of the acyl group. Therefore, the present inventors speculated that the cellulose acylate with a low degree of substitution (that is, the proportion occupied by the acyl group is small) forms a hydrogen bond with a compound having the hydrogen bonding property so that the apparent shear strength is increased, which is preferable. Further, the present inventors speculated that the crystallinity of the cellulose acylate film is increased as the degree of substitution of cellulose acylate is higher, a crystal portion becomes a stress concentration point, and this stress concentration point becomes a starting point of occurrence of damage due to partial contact between the film surface and the backlight unit. Therefore, the present inventors considered it is preferable that the degree of substitution of cellulose acylate is low from the viewpoint of further suppressing occurrence of damage. From this viewpoint, the degree of substitution of cellulose acylate contained in at least the surface area on the backlight side is preferably in a range of 2.20 to 2.60 and more preferably in a range of 2.20 to 2.50. It is preferable that the compound having a hydrogen bonding property indicates a urethane bond-containing compound described above.

Meanwhile, the degree of substitution of cellulose acylate contained in a part of a region from the surface of the most BL side protective film on the polarizer side toward the film thickness direction is not particularly limited. For example, the degree of substitution of cellulose acylate contained in a part of a region from the surface on the polarizer side toward the film thickness direction can be set to be in a range of 2.00 to 2.95. Further, according to the aspect, the degree of substitution of cellulose acylate contained in the surface area of the most BL side protective film on the polarizer side is preferably in a range of 2.60 to 2.95 from the viewpoint of film durability.

The degree of substitution of cellulose acylate in a region (intermediate region) between the surface area on the backlight unit side and the surface area on the polarizer side is not particularly limited. For example, according to the aspect, the degree of substitution of cellulose acylate in the intermediate region may be constant from the backlight unit side to the polarizer side or may be stepwise or continuously changed.

The degree of polymerization of cellulose acylate is not particularly limited. The viscosity average polymerization degree is preferably in a range of 180 to 700. The viscosity average polymerization degree of cellulose acylate containing only an acetyl group, that is, cellulose acetate is more preferably in a range of 180 to 550, still more preferably in a range of 180 to 400, and even still more preferably in a range of 180 to 350. It is preferable that the degree of polymerization is less than or equal to the above-described upper limit from the viewpoint that the viscosity of the composition for film formation which contains cellulose acylate is not extremely increased and a film can be easily prepared through casting. It is preferable that the degree of polymerization is greater than or equal to the above-described lower limit from the viewpoint that a film with high strength can be prepared. The viscosity average polymerization degree can be measured according to an Uda et al's intrinsic viscosity method {Kazuo Uda. Hideo Saito, "the Journal of the Fiber Society", Vol. 18, No. 1, pp. 105 to 120 (1962)}. This method is described in detail in JP1997-95538A (JP-H09-95538A).

Further, molecular weight distribution of cellulose acylate is evaluated by gel permeation chromatography, and it is preferable that the polydispersity index Mw/Mn (Mw represents the weight-average molecular weight and Mn represents the number average molecular weight) is small and the molecular weight distribution is narrow. Specific value of Mw/Mn is preferably in a range of 1.0 to 4.0, more preferably in a range of 2.0 to 4.0, and still more preferably in a range of 2.3 to 3.4.

—Acrylic Resin—

In a case where the most BL side protective film is an acrylic resin film, the acrylic resin film contains an acrylic resin as a constituent component of the film. In the present invention and the present specification, the "acrylic resin" indicates a polymer of a derivative of methacrylic acid and/or a derivative of acrylic acid. The derivative is, for example, an ester. It is preferable that the acrylic resin has a repeating structural unit derived from a (meth)acrylic acid ester monomer as a repeating structural unit. The "(meth) acrylic acid" indicates acrylic acid and/or methacrylic acid.

The acrylic resin may have a repeating structural unit obtained by polymerizing at least one selected from a hydroxyl group-containing monomer, an unsaturated carboxylic acid, and a monomer represented by Formula (10) as a repeating structural unit.

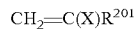
$$CH_2=C(X)R^{201} \quad\quad \text{Formula (10)}$$

In Formula (10), $R^{201}$ represents a hydrogen atom or a methyl group. X represents a hydrogen atom, an alkyl group having 1 to 20 carbon atoms, an aryl group, a —CN group, a —CO—$R^{202}$ group, or a —O—CO—$R^{203}$ group, and $R^{202}$ and $R^{203}$ each independently represent a hydrogen atom or an organic residue having 1 to 20 carbon atoms.

The (meth)acrylic acid ester monomer is not particularly limited. The details can be referred to paragraph 0034 of JP2013-099875A.

The hydroxyl group-containing monomer is also not particularly limited as well. The details can be referred to paragraph 0035 of JP2013-099875A.

The unsaturated carboxylic acid is also not particularly limited. The details can be referred to paragraph 0036 of JP2013-099875A.

The details of the monomer represented by Formula (10) can be referred to paragraph 0037 of JP2013-099875A.

The acrylic resin may have one or more lactone ring structures. According to an aspect of the lactone ring structure, a lactone ring structure represented by Formula (11) can be exemplified.

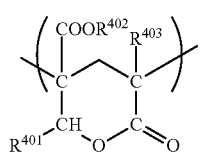

Formula (11)

In Formula (11), $R^{401}$, $R^{402}$, and $R^{403}$ each independently represent a hydrogen atom or an organic residue having 1 to 20 carbon atoms, and the organic residue may contain an oxygen atom. Here, preferred examples of the organic residue having 1 to 20 carbon atoms include a methyl group, an ethyl group, an isopropyl group, an n-butyl group, and a t-butyl group.

The content ratio of the lactone ring structure represented by Formula (11) in the structure of the lactone ring-containing acrylic resin is preferably in a range of 5% to 90% by mass, more preferably in a range of 10% to 70% by mass, still more preferably in a range of 10% to 60% by mass, and even still more preferably in a range of 10% to 50% by mass.

A method of producing the lactone ring-containing acrylic resin is not particularly limited. For example, a polymer (p) containing a hydroxyl group and an ester group in a molecular chain is obtained by performing a polymerization step, and the obtained polymer (p) is subjected to a heat treatment to introduce a lactone ring structure into a polymer (lactone cyclization condensation step), thereby obtaining a lactone ring-containing acrylic resin. The details of preferable physical properties of the lactone ring-containing acrylic resin can be referred to paragraphs 0040 to 0047 of JP2012-250535A.

The acrylic resin can also be referred to paragraphs 0015 to 0093 of JP2012-8248A.

Further, an acrylic resin having a glutarimide structure can be exemplified as the acrylic resin. Such an acrylic resin can be referred to paragraphs 0021 to 0037 of JP2013-37057A.

Further, an acrylic resin having a glutaric anhydride unit can be exemplified as the acrylic resin. Such an acrylic resin can be referred to paragraphs 0026 to 0050 of JP2009-139720A.

As the acrylic resin, commercially available products or those obtained by being synthesized according to known synthetic methods can be used.

—Polyester—

In a case where the most BL side protective film is a polyester film, the polyester film contains polyester as a constituent component of the film.

Examples of the polyester include polyethylene terephthalate, polyethylene isophthalate, polyethylene 2,6-naphthalate, polybutylene terephthalate, and 1,4-cyclohexane dimethylene terephthalate, and two or more of these may be used as necessary. Among these, polyethylene terephthalate is preferable. In addition, the polyester can be referred to paragraph 0066 of JP2015-106067A.

The organic solvent-soluble resin film used as the most BL side protective film may contain an organic solvent-soluble resin as a component having the highest content ratio (for example, a content ratio of 50% to 98% by mass) with respect to the total mass of the film. The content ratio of the organic solvent-soluble resin in the organic solvent-soluble resin film can be appropriately set according to the kind of the organic solvent-soluble resin. The content ratio is a ratio of the total amount of the organic solvent-soluble resin contained in the film to the total mass of the entire film. In the most BL side protective film, it is preferable that the content of the urethane bond-containing compound in one surface area is different from the content of the urethane bond-containing compound in the other surface area as described above. Therefore, the content ratios of the organic solvent-soluble resin in each portion of the organic solvent-soluble resin film sued as the most BL side protective film are different from one another in some cases.

(Other Components)

The most BL side protective film may or may not contain various components described above and one or more additives at optional content ratios. In the most BL side protective film, it is preferable that the content of the urethane bond-containing compound in one surface area is different from the content of the urethane bond-containing compound in the other surface area as described above. Accordingly, the content ratios of additives to be optionally added may vary in each portion of the film. Known techniques can be applied without limitation to the kinds and the content ratios of additives to be optionally added. Examples of the additives include sugar ester, a plasticizer, an organic acid, a dye, a retardation adjusting agent, an ultraviolet absorbing agent, an antioxidant, and a matting agent. These additives can be referred to paragraphs 0062 to 0097 of JP2012-155287A and paragraphs 0070 to 0107 of JP2013-097170A.

(Configuration and Thickness of Film)

From the viewpoint of each of producing a film in which the apparent shear strength measured at the surface on the BL side is different from the apparent shear strength measured at the surface on the polarizer side, it is preferable that the most BL side protective film is a laminated film having a laminated structure of two or more layers. In the laminated film having a laminated structure of two or more layers, it is preferable that layers adjacent to each other directly come into contact with each other without an adhesive therebetween. It is preferable that such a laminated film can be produced according to a solution film forming method or a melt film forming method described below. In the present invention and the present specification, the concept of "adhesive" indicates both of an adhesive and a pressure sensitive adhesive.

The thickness (the total thickness of the laminated film) of the most BL side protective film is, for example, in a range of 10 to 100 μm, preferably in a range of 12 to 80 μm, and more preferably in a range of 15 to 60 μm. The thickness can be adjusted by production conditions at the time of producing a film. The thickness of the most BL side protective film can be acquired using the production conditions and can also be acquired using a known film thickness measuring method, for example, a film thickness measuring method that is performed using a stylus type film thickness meter. In a case where measurement is performed on a plurality of sites of a film, the thickness of the film is obtained by arithmetically averaging the measured values from the plurality of sites.

(Production Method)

The most BL side protective film can be produced according to a known film forming method, and it is preferable that the most BL side protective film is produced according to a known film forming method used for producing a laminated film having a laminated structure of two or more layers. For example, the most BL side protective film can be produced by a solution film forming method. The solution film forming method includes at least a film forming step of preparing a composition (also referred to as a dope, a dope composition, or a dope solution) for film formation, casting this composition for film formation on a support, drying the composition to form a film, and stripping this film off from the support. For example, a drum support or a band support can be used as the support. The formed film can be subjected to a stretching treatment as necessary. Here, a laminated film can be produced as a multilayer co-casting film formed of two or more layers by co-casting two or more compositions for film formation. Known techniques described in paragraphs 0034 to 0068 of WO2015/064732A1 can be applied without limitation to film production carried out using a solution film forming method.

According to another aspect, the most BL side protective film can be produced according to a melt film forming method such as an extrusion forming method. Known techniques described in paragraphs 0057 to 0063 of JP2012-180422A can be applied without limitation to film production carried out using a melt film forming method.

Hereinbefore, the most BL side protective film included in the polarizing plate serving as a member positioned closest to the backlight unit side in the liquid crystal panel, constituting the liquid crystal display device, has been described. From the viewpoint of protecting the polarizer, it is preferable that the polarizing plate serving as a member positioned closest to the backlight unit side also includes a protective film (the other protective film) on the opposite side to the most BL side protective film. As the other protective film, various films typically used as polarizing plate protective films can be used without limitation.

Further, as a film used as the other protective film, an optical compensation film including an optical compensation layer that has an optically anisotropic layer can be exemplified. According to the optical compensation film (also referred to as a phase difference film), viewing angle characteristics of a screen in the liquid crystal display device can be improved. A known film can be used as the optical compensation film. From the viewpoint of widening the viewing angle, an optical compensation film described in JP2001-100042A is preferable.

It is preferable that the liquid crystal display device includes two polarizing plate (a front-side polarizing plate and a rear-side polarizing plate). In this case, the polarizing plate including the most BL side protective film is a rear-side polarizing plate. The front-side polarizing plate used together with the most BL side protective film (rear-side polarizing plate) is not particularly limited. Any known techniques related to a polarizing plate can be applied without limitation to the front-side polarizing plate.

<Polarizer>

The polarizing plate including the most BL side protective film includes at least a polarizer together with the most BL side protective film. The polarizer may be a so-called linear polarizer having a function of converting natural light into specific linear polarized light. It is preferable that an absorption type polarizer is used as the polarizer. As the absorption type polarizer, a polarizer which has been typically used can be used, and examples thereof include an iodine-based polarizer, a dye-based polarizer obtained by using a dichroic dye, a polyene-based polarizer, and a polarizer obtained by using a wire grid. The iodine-based polarizer and the dye-based polarizer can be prepared by allowing iodine or a dichroic dye to be adsorbed on a polyvinyl alcohol-based film and stretching the film. As a preferred aspect of the polarizer, an iodine dye polyvinyl alcohol-based film can be exemplified. The thickness of the polarizer is not particularly limited. According to the aspect, the thickness of the polarizer can be set to be, for example, in a range of 0.1 μm to 50 m. From the viewpoint of reducing the thickness of the polarizing plate, the thickness of the polarizer is preferably 30 μm or less and more preferably 20 μm or less.

In addition, the polarizer may be a so-called coating type polarizer. The coating type polarizer can be referred to paragraphs 0052 and 0053 of JP2014-170202A.

The polarizer and the protective film can adhere to each other according to a known method. For example, a polyvinyl alcohol-based film (polarizer) can adhere to the protective film using a so-called water paste action of polyvinyl alcohol by performing adhesion to the protective film while water is blown to a surface of a polyvinyl alcohol-based film. Alternatively, the polarizer and the protective film can also adhere to each other through an adhesive. In the present invention and the present specification, the concept of "adhesive" also includes a pressure sensitive adhesive as described above. As the adhesive, an aqueous solution of polyvinyl alcohol or polyvinyl acetal (for example, polyvinyl butyral) or latex of a vinyl-based polymer (for example, polybutyl acrylate) can be used. An aqueous solution of polyvinyl alcohol is preferable as the adhesive, and an aqueous solution of completely saponified polyvinyl alcohol is more preferable as the adhesive. Further, adhesion between the polarizer and the protective film using an adhesive can be referred to known techniques described in paragraphs 0126 to 0135 of JP2012-180422A.

<Liquid Crystal Cell>

The liquid crystal panel included in the liquid crystal display device includes a liquid crystal cell together with the polarizing plate described above. Further, the liquid crystal cell is also referred to as a liquid crystal display element. Examples of the liquid crystal cell include a twisted nematic (TN) type liquid crystal cell, a super-twisted nematic (STN) type liquid crystal cell, a triple super twisted nematic (TSTN) type liquid crystal cell, a multi-domain type liquid crystal cell, a vertical alignment (VA) type liquid crystal cell, an in-plane switching (IPS) type liquid crystal cell, and an optically compensated bend (OCB) type liquid crystal cell. A liquid crystal cell has a typical configuration in which a liquid crystal layer is disposed between two glass substrates.

As the liquid crystal cell, an in-cell touch panel liquid crystal cell or an on-cell touch panel liquid crystal cell formed by incorporating a touch panel function in any type of liquid crystal cell from among the examples described above can be exemplified. In addition, a form in which a film type touch sensor is attached to a liquid crystal cell is also exemplified.

An in-cell touch panel liquid crystal cell can be formed into an in-cell touch panel liquid crystal cell formed by incorporating a resistive film type, capacitance type, or optical touch panel function in the liquid crystal cell having a liquid crystal layer interposed between two glass substrates. Known techniques described in JP2011-76602A, JP2011-222009A, and the like can be applied without limitation to the in-cell touch panel liquid crystal cell.

An on-cell touch panel liquid crystal cell can be formed into, preferably, an on-cell touch panel liquid crystal cell formed by incorporating a resistive film type, capacitance type, or optical touch panel function in a space between a polarizing plate and the glass substrates having a liquid crystal layer interposed therebetween. The on-cell touch panel liquid crystal cell is described in JP2012-88683A or the like.

The liquid crystal panel included in the liquid crystal display device includes at least the above-described constituent members (the polarizing plate and the liquid crystal cell) and may include one or more optional other constituent members. As such constituent members, one or more members among various members typically included in a liquid crystal panel can be used.

[Backlight Unit]

The backlight unit included in the liquid crystal display device may be an edge light type backlight unit or a direct type backlight unit. The backlight unit includes at least a light source and may include one or more known members such as a diffusion member, a reflection plate, a light guide plate, a brightness enhancement film, and a prism sheet. Occurrence of damage to the surface of the most BL side protective film on the BL side due to partial contact between the surface of a member positioned closest to the liquid crystal panel side in the backlight unit and the surface of the most BL side protective film on the BL side, which is the outermost surface of the liquid crystal panel on the backlight unit side for some reason results in degradation (light leakage) of display performance of the liquid crystal display device. Meanwhile, in the liquid crystal display device, the apparent shear strength measured at the surface of the most BL side protective film on the BL side is 106 MPa or greater. Due to this, it is possible to prevent damage to the surface of the most BL side protective film on the BL side caused by the above-described contact.

It is preferable that the member positioned closest to the liquid crystal panel side in the backlight unit is a diffusion member. It is effective that the member positioned closest to the liquid crystal panel side in the backlight unit is a diffusion member because the brightness of the display surface of the liquid crystal display device is improved. However, damage to the surface of the most BL side protective film on the BL side due to partial contact between the diffusion member and the surface of the most BL side protective film on the BL side may result in degradation of display performance even in a case where the improvement of brightness has been achieved in the liquid crystal display device. Meanwhile, the present inventors speculated that both of improvement in brightness and excellent display performance can be achieved since occurrence of damage to the surface of the most BL side protective film on the BL side can be suppressed according to the liquid crystal display device including the most BL side protective film. Further, in the polarizing plate including the most BL side protective film, the apparent shear strength measured at the surface of the most BL side protective film on the polarizer side is 101 MPa or less. In this manner, it is possible to suppress occurrence of cracks at the time of cutting the polarizing plate.

Known techniques can be applied without limitation to the light source included in the backlight unit and the diffusion member and other various members which can be included in the backlight unit.

EXAMPLES

The present invention will be described in more detail with reference to the following examples. The materials, the used amounts, the proportions, the treatment contents, and the treatment procedures described in the following examples can be appropriately changed within the range not departing from the scope of the present invention. Accordingly, the present invention should not be limitatively interpreted by the following specific examples. The solid content described below indicates a component excluding a solvent.

<Preparation of Cellulose Acylate Dopes a to g>

Cellulose acylate and additives listed in Table 1 were prepared such that the concentration of solid contents was adjusted to 23% by mass using the following solvents, put into a mixing tank, stirred, and dissolved, thereby preparing cellulose acylate (cellulose acetate) dopes a to g. The degree of substitution of cellulose acylate used for cellulose acylate dopes (also simply referred to as "dopes") a to g was 2.85.

TABLE 1

| Dope | Solvent | Cellulose acylate [parts by mass] | Additive [parts by mass] | | | | | | | |
|---|---|---|---|---|---|---|---|---|---|---|
| | | | TPP | BDP | Sugar ester 1 | Sugar ester 2 | Compound A | Compound B | UV1 | UV2 |
| a | S1 | 100 | 3.8 | 2.7 | — | — | — | — | 1.3 | 0.3 |
| b | S1 | 100 | — | — | 5.3 | 1.8 | — | — | 2.0 | — |
| c | S1 | 100 | — | — | — | — | 10 | — | 1.3 | 0.3 |
| d | S1 | 100 | — | — | — | — | 50 | — | 1.3 | 0.3 |
| e | S2 | 100 | 3.8 | 2.7 | — | — | — | — | 1.3 | 0.3 |
| f | S2 | 100 | — | — | 5.3 | 1.8 | — | — | 2.0 | — |
| g | S2 | 100 | — | — | — | — | — | 5 | 1.3 | 0.3 |

Solvent S1: dichloromethane/methanol/butanol = 81/18/1 (mass ratio)
Solvent S2: dichloromethane/methanol = 87/13 (mass ratio)
TPP: triphenyl phosphate
BDP: biphenyl diphenyl phosphate
Sugar ester 1: MONOPET SB (registered trademark, manufactured by DKS Co., Ltd.)
Sugar ester 2: SAIB-100 (manufactured by Eastman chemical Company)
Compound A: exemplary compound described above (urethane bond-containing compound) A
Compound B: exemplary compound described above (urethane bond-containing compound) B
UV1: compound with the following structure

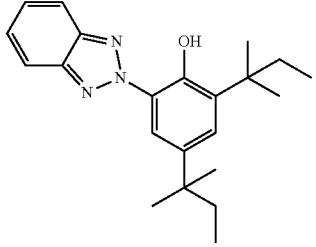 [SMILES: CCC(C)(C)c1cc(-n2nc3ccccc3n2)c(O)c(C(C)(C)CC)c1]

UV2: compound with the following structure

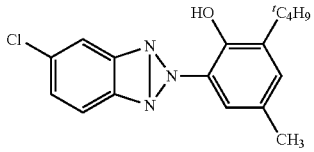

Specifically, the dopes a to g were prepared according to the following method. The dopes A to U described below were produced as described below.

The solvents and the additives described above were put into a stainless steel dissolution tank having a stirring blade, and cellulose acylate was gradually added to the tank while the mixture was stirred and dispersed. After completion of the addition, the resultant was stirred at room temperature for 2 hours, swollen for 3 hours, and stirred again, thereby obtaining a cellulose acylate dope. The swollen dope was heated to a dope temperature of 50° C. by a pipe provided with a jacket in the tank and further heated to a dope temperature of 90° C. under a pressure of 1.2 MPa so as to be dissolved. The heating time was 15 minutes. Next, the dope temperature was decreased to 36° C., thereby obtaining each of dopes a to g.

<Preparation of Cellulose Acylate Dopes A to U>

Cellulose acylate and additives listed in Table 2 were prepared such that the concentration of solid contents was adjusted to 23% by mass using the following solvents, put into a mixing tank, stirred, and dissolved, thereby preparing cellulose acylate (cellulose acetate) dopes A to U. The solvents S1 and S2, the compound A, and the compound B listed in Table 2 are as described above.

TABLE 2

| Dope | Solvent | Cellulose acylate Acetyl substitution degree | [parts by mass] | Additive [parts by mass] Compound A | Compound B |
|---|---|---|---|---|---|
| A | S1 | 2.85 | 100 | 30 | — |
| B | S1 | 2.85 | 100 | 50 | — |
| C | S1 | 2.85 | 100 | — | 50 |
| D | S1 | 2.45 | 100 | 20 | — |
| E | S1 | 2.45 | 100 | 30 | — |
| F | S1 | 2.45 | 100 | 50 | — |
| G | S1 | 2.45 | 100 | 70 | — |
| H | S1 | 2.45 | 100 | — | 30 |
| I | S1 | 2.45 | 100 | — | 50 |
| J | S1 | 2.45 | 100 | — | 70 |
| K | S1 | 2.85 | 100 | — | — |
| L | S1 | 2.45 | 100 | — | — |
| M | S1 | 2.85 | 100 | 10 | — |
| N | S1 | 2.45 | 100 | 5 | — |
| O | S1 | 2.85 | 100 | — | 10 |
| P | S2 | 2.85 | 100 | 50 | — |
| Q | S2 | 2.85 | 100 | — | 50 |
| R | S2 | 2.45 | 100 | 50 | — |
| S | S2 | 2.45 | 100 | — | 30 |
| T | S2 | 2.45 | 100 | — | 50 |
| U | S2 | 2.85 | 100 | — | — |

Example 1: Film Formation Obtained by Using Co-Casting

As a casting die, a device equipped with a feed block adjusted for co-casting and capable of forming a film having a two-layer structure by laminating one more layer in addition to the main stream to be cast on a support was used. In the description below, a layer to be formed from the main stream is referred to as a core layer and a layer to be laminated on the core layer on the opposite side of the support is referred to as a skin layer. Further, as a liquid sending flow channel of dopes, two flow channels for a core layer and a skin layer were used.

The dope a as the cellulose acylate dope for a core layer and the dope A as the cellulose acylate dope for a skin layer were co-cast on a drum (support) cool to −7° C. from a casting port. At this time, the flow rate of each dope was adjusted such that the final thickness of the core layer and the final thickness of the skin layer after steps such as stretching described below were performed were respectively set to 35 µm and 5 µm. The cast dope film was dried such that dry air at 34° C. was blown to the film on the drum at an air quantity of 230 m³/min and then peeled off from the drum. At the time of peeling, 8% of the film was stretched in a transport direction (longitudinal direction). Thereafter, the film was transported while both ends of the film were gripped in a width direction (a direction orthogonal to the casting direction) using a pin tenter (pin tenter shown in FIG. 3 of JP1992-1009A (JP-H04-1009A)). Further, the film was further dried by being transported between rolls of a heat treatment device so that a film having a thickness of 40 µm was prepared, and this film was set as the most BL side protective film of Example 1.

Examples 2 to 16 and Comparative Example 1 to 7

Most BL side protective films of Examples 2 to 16 and Comparative Examples 1 to 7 were formed in the same manner as in Example 1 except that the types of the cellulose acylate dope for a core layer and the cellulose acylate dope for a skin layer in the formation of the most BL side protective film were changed and the final thickness of each layer was changed to the value listed in Table 3. In Comparative Examples 6 and 7, single layer casting was performed without using a cellulose acylate dope for a skin layer to obtain a single layer film.

Example 17: Film Formation Using Co-Casting

A dope e as a cellulose acylate dope for a core layer and a dope P as a cellulose acylate dope for a skin layer were filtered with filter paper having an average pore diameter of 34 µm and a sintered metallic filter having an average pore diameter of 10 µm and were co-cast (band casting machine) on a band (support) having a surface temperature of 20° C. from a casting port. At this time, the flow rate of each dope was adjusted such that the final thickness of the core layer and the final thickness of the skin layer after steps such as stretching described below were performed were respectively set to 35 µm and 5 µm. The cast dope film was peeled off from the band in a state in which the content ratio of the solvent was 30% by mass, both ends of the film in the width direction were fixed with tenter clips, and the film was dried while 8% of the film was stretched in the lateral direction. Thereafter, the film was further dried by being transported between rolls of a heat treatment device so that a cellulose acylate film having a thickness of 40 µm was prepared, and this film was set as the most BL side protective film of Example 17.

Examples 18 to 23 and Comparative Example 8

Most BL side protective films of Examples 18 to 23 and Comparative Example 8 were formed in the same manner as in Example 17 except that the types of the cellulose acylate dope for a core layer and the cellulose acylate dope for a skin layer in the formation of the most BL side protective film were changed and the final thickness of each layer was changed to the value listed in Table 3.

The cellulose acylate film formed by co-casting the cellulose acylate dope for a core layer and the cellulose acylate dope for a skin layer is a laminated film having a laminated structure of two layers. In the preparation of a polarizing plate and the preparation of a liquid crystal display device described below, the polarizing plate and the liquid crystal display device were prepared by adhering the most BL side protective film to the polarizer such that the skin layer side was disposed on the backlight unit side and the core layer side was disposed on the polarizer side. In the most BL side polarizing plate which is a laminated film having a laminated structure of two layers, the content of the compound A or the compound B (urethane bond-containing compound) and the degree of substitution of cellulose acylate in the surface area on the backlight unit side can be regarded as the same as the content and the degree of substitution (see Table 3) in the cellulose acylate dope for a skin layer. In the most BL side polarizing plate which is a laminated film having a laminated structure of two layers, the content of the compound A or the compound B (urethane bond-containing compound) and the degree of substitution of cellulose acylate in the surface area on the polarizer side can be regarded as the same as the content (see Table 3) and the degree of substitution (see the description above) in the cellulose acylate dope for a core layer.

[Measurement of Apparent Shear Strength]

Samples for measuring the apparent shear strength were cut out from each cellulose acylate film prepared as the most BL side protective films of the examples and the comparative examples.

With the samples for measurement, the apparent shear strengths of both surfaces of the samples for measurement were acquired according to the method described above using a SAICAS-NN type measuring device (manufactured by DAIPLA WINTES CO., LTD.) in a constant speed mode.

[Preparation of Polarizing Plate]

<Preparation of Polarizer>

A polarizer (iodine dye polyvinyl alcohol-based film) having a thickness of 20 μm was prepared by allowing iodine to be adsorbed on the stretched polyvinyl alcohol-based film according to Example 1 of JP2001-141926A.

<Adhesion Between Polarizer and Protective Film>

The polarizer prepared in the above-described manner was adhered to the cellulose acylate film of each example or each comparative example as a protective film on one side and also adhered to a commercially available cellulose acylate film (FUJITAC (registered trademark) ZRD40, manufactured by Fujifilm Corporation) as a protective film on the other side. In adhesion between the cellulose acylate film which is a laminated film having a laminated structure of two layers of each example and each comparative example and the polarizer, the surface on the core layer side was set as an adhesion surface to be adhered to the polarizer.

The polarizer and the protective film were adhered to each other through an adhesive (an aqueous solution of completely saponified polyvinyl alcohol) by carrying out a saponification treatment on the protective film and setting the saponified surface as the adhesion surface. The saponification treatment was performed as follows. Each cellulose acylate film was immersed in a 1.5 mol/L NaOH aqueous solution (saponified solution) whose liquid temperature was maintained to 55° C. for 2 minutes, the film was washed with water, immersed in a 0.05 mol/L sulfuric acid aqueous solution at a liquid temperature of 25° C. for 30 seconds, allowed to pass under running water for 30 seconds, and allowed to enter a neutral state. Next, draining of the film was repeated three times using an air knife, and the drained film was allowed to stay in a drying zone at an ambient temperature of 70° C. for 15 seconds for drying, thereby obtaining a saponified film.

In this manner, polarizing plates of the examples and the comparative examples were prepared.

[Cutting Processability]

The polarizing plates prepared in the above-described manner were punched using a Thomson knife and 10 test pieces respectively having a size of 4 cm×4 cm were prepared in each example and each comparative example. The presence or absence of cracks in the peripheral edge of each test piece was observed. The lengths of cracks observed in the peripheral edge of each test piece were summed up, and a crack occurrence rate was acquired as the ratio with respect to the lengths (16 cm) of four sides of a test piece. The cutting processability was evaluated based on the following standard by arithmetically averaging the crack occurrence rates of ten test pieces. A to C indicate that the plates can be practically used, A or B is preferable, and A is more preferable.

A: Cracks were not found from the entire peripheral edge of the test piece.

B: The crack occurrence rate was less than 5%.

C: The crack occurrence rate was in a range of 5% to 20%.

D: The crack occurrence rate was greater than 20%.

[Preparation of Liquid Crystal Display Device]

Between two sheets of polarizing plates including a liquid crystal cell therebetween, a polarizing plate (rear-side polarizing plate) on a backlight unit side was peeled off from a commercially available liquid crystal television (a slim type 42 type liquid crystal television in an IPS mode), and each polarizing plate prepared in the examples and the comparative examples was re-adhered to the liquid crystal cell through an adhesive such that each cellulose acylate film prepared in the examples and the comparative examples was disposed closest to the backlight unit side. In the cellulose acylate film as a laminated film having a laminated structure of two layers, the skin layer side was disposed on the backlight unit side and the core layer side was disposed on the polarizer side. A sheet-like member positioned closest to the liquid crystal panel side in the backlight unit, mounted on the commercially available liquid crystal television, was a sheet like member (diffusion member) having a haze of 50% to 100%. The liquid crystal television was configured to have an edge light type backlight unit, a rear-side polarizing plate, a liquid crystal cell, and a front-side polarizing plate in this order. Here, an outer protective film on the rear-side polarizing plate is the protective film (most BL side protective film) prepared in the above. The front-side polarizing plate is a front-side polarizing plate mounted on the commercially available liquid crystal television.

In this manner, liquid crystal display devices (liquid crystal televisions) of the examples and the comparative examples were prepared.

[Evaluation of Damage]

After each liquid crystal television of the examples and the comparative examples was vibrated, a lighting test was performed thereon, and evaluation of whether light leakage (bright spot defect) was confirmed from a display surface was visually performed. Specifically, periodically changing vibration at a gravitational acceleration of 1.5 G (1.0 G is 9.80665 m/s$^2$), an amplitude of 0.8 mm, and a frequency of 10 to 40 Hz was applied to a packed liquid crystal television in an x direction, a y direction, and a z direction for 20 minutes using a vibration tester (BF-100UT, manufactured by IDEX CO., LTD.) as a tester. After each liquid crystal television was vibrated, the lighting test was performed.

The above-described evaluation was performed on each liquid crystal television of the examples and the comparative examples, and the presence or absence of light leakage (bright spot defect) was confirmed. After the confirmation, the rear-side polarizing plate mounted on the liquid crystal television was changed into a new polarizing plate, the same evaluation was performed 20 times in total, and the evaluation was performed based on the following standard. The liquid crystal televisions evaluated as the ranks A to C can be practically used, the rank A or B is preferable, and the rank A is more preferable. The rear-side polarizing plate was taken out from the liquid crystal television from which light leakage (bright spot defect) was observed and the television was visually observed. As the result, damage was confirmed from the surface disposed on the backlight unit side.

A: In the evaluation carried out 20 times, light leakage was not observed 20 times.

B: In the evaluation carried out 20 times, light leakage was observed once.

C: In the evaluation carried out 20 times, light leakage was observed 2 or 3 times.

D: In the evaluation carried out 20 times, light leakage was observed 4 or more times.

The above-described results are listed in Table 3.

TABLE 3

| | Cellulose acylate film | | | | | | | | | | | Total thickness of film [μm] | Evaluation result for damage | Evaluation result for cutting processability |
|---|---|---|---|---|---|---|---|---|---|---|---|---|---|---|
| | Skin layer (positioned on backlight unit side in liquid crystal display device) | | | | | | Core layer (positioned on polarizer side in liquid crystal display device) | | | | | | | |
| | Dope | Cellulose acylate substitution degree | Content of urethane bond-containing compound A [parts by mass] | Content of urethane bond-containing compound B [parts by mass] | Thickness [μm] | Apparent shear strength [MPa] | Dope | Content of urethane bond-containing compound A [parts by mass] | Content of urethane bond-containing compound B [parts by mass] | Thickness [μm] | Apparent shear strength [MPa] | | | |
| Example 1 | A | 2.85 | 30 | — | 5 | 106 | a | — | — | 35 | 76 | 40 | C | A |
| Example 2 | B | 2.85 | 50 | — | 5 | 110 | a | — | — | 35 | 76 | 40 | C | A |
| Example 3 | C | 2.85 | — | 50 | 5 | 109 | a | — | — | 35 | 77 | 40 | C | A |
| Example 4 | B | 2.85 | 50 | — | 5 | 110 | b | — | — | 35 | 85 | 40 | C | B |
| Example 5 | C | 2.85 | — | 50 | 5 | 109 | c | 10 | — | 35 | 95 | 40 | C | C |
| Example 6 | C | 2.85 | — | 50 | 6 | 109 | b | — | — | 54 | 86 | 60 | C | B |
| Example 7 | D | 2.45 | 20 | — | 5 | 110 | a | — | — | 35 | 76 | 40 | B | A |
| Example 8 | E | 2.45 | 30 | — | 5 | 113 | a | — | — | 35 | 76 | 40 | B | A |
| Example 9 | F | 2.45 | 50 | — | 5 | 117 | b | — | — | 35 | 77 | 40 | A | A |
| Example 10 | F | 2.45 | 50 | — | 5 | 117 | a | — | — | 35 | 86 | 40 | A | B |
| Example 11 | G | 2.45 | 70 | — | 3 | 118 | a | — | — | 37 | 76 | 40 | A | A |
| Example 12 | G | 2.45 | 70 | — | 5 | 117 | a | — | — | 30 | 76 | 35 | A | A |
| Example 13 | H | 2.45 | — | 30 | 5 | 112 | a | — | — | 35 | 76 | 40 | B | B |
| Example 14 | I | 2.45 | — | 50 | 5 | 116 | b | — | — | 35 | 86 | 40 | A | B |
| Example 15 | J | 2.45 | — | 70 | 5 | 117 | a | — | — | 35 | 77 | 40 | A | A |
| Example 16 | F | 2.45 | 50 | — | 7 | 116 | c | — | — | 33 | 95 | 40 | A | C |
| Comparative Example 1 | K | 2.85 | — | — | 5 | 84 | a | — | — | 35 | 77 | 40 | D | A |
| Comparative Example 2 | L | 2.45 | — | — | 5 | 96 | a | — | — | 35 | 77 | 40 | D | A |

TABLE 3-continued

| | | Cellulose acylate film | | | | | | | | | | | Evaluation result | |
|---|---|---|---|---|---|---|---|---|---|---|---|---|---|---|
| | | Skin layer (positioned on backlight unit side in liquid crystal display device) | | | | | Core layer (positioned on polarizer side in liquid crystal display device) | | | | | Total thickness of film [μm] | Evaluation result for damage | Evaluation result for cutting processability |
| | Dope | Cellulose acylate substitution degree | Content of urethane bond-containing compound A [parts by mass] | Content of urethane bond-containing compound B [parts by mass] | Thickness [μm] | Apparent shear strength [MPa] | Dope | Content of urethane bond-containing compound A [parts by mass] | Content of urethane bond-containing compound B [parts by mass] | Thickness [μm] | Apparent shear strength [MPa] | | | |
| Comparative Example 3 | M | 2.85 | 10 | — | 5 | 94 | a | — | — | 35 | 76 | 40 | D | A |
| Comparative Example 4 | N | 2.45 | 5 | — | 3 | 101 | a | — | — | 37 | 76 | 40 | D | A |
| Comparative Example 5 | O | 2.85 | — | 10 | 5 | 94 | a | — | — | 35 | 76 | 40 | D | A |
| Comparative Example 6 | — | — | — | — | — | — | a | — | — | 35 | 77 | 35 | D | A |
| Comparative Example 7 | — | — | — | — | — | — | d | 50 | — | 40 | 111 | 40 | D | D |
| Example 17 | P | 2.85 | 50 | — | 5 | 113 | e | — | — | 35 | 79 | 40 | B | A |
| Example 18 | Q | 2.85 | — | 50 | 5 | 112 | e | — | — | 35 | 79 | 40 | B | A |
| Example 19 | R | 2.45 | 50 | — | 5 | 120 | e | — | — | 35 | 81 | 40 | A | A |
| Example 20 | R | 2.45 | 50 | — | 5 | 120 | e | — | — | 20 | 81 | 25 | A | A |
| Example 21 | S | 2.45 | — | 30 | 5 | 116 | e | — | — | 35 | 80 | 40 | A | A |
| Example 22 | T | 2.45 | — | 50 | 5 | 118 | f | — | — | 35 | 91 | 40 | A | B |
| Example 23 | T | 2.45 | — | 50 | 5 | 118 | g | — | 5 | 35 | 95 | 40 | A | C |
| Comparative Example 8 | U | 2.85 | — | — | 5 | 91 | e | — | — | 35 | 80 | 40 | D | A |

Based on the results listed in Table 3, the liquid crystal display device of each example was confirmed such that the polarizing plate protective film positioned closest to a backlight unit side in a liquid crystal panel is unlikely to be damaged due to partial contact with the backlight unit, and the polarizing plate that includes the polarizing plate protective film is a polarizing plate in which occurrence of cracks caused by cutting is suppressed.

The present invention is useful in the technical field of a liquid crystal display device.

What is claimed is:

1. A liquid crystal display device comprising:
a liquid crystal panel which includes at least a liquid crystal cell and a polarizing plate; and
a backlight which includes at least a light source,
wherein the polarizing plate includes a polarizer and at least one protective film,
the at least one protective film included in the polarizing plate is positioned closest to the backlight side in the liquid crystal panel,
the protective film positioned closest to the backlight side in the liquid crystal panel is an organic solvent-soluble resin film in which an apparent shear strength measured at a surface on the backlight side is 106 MPa or greater and an apparent shear strength measured at a surface on the polarizer side is 95 MPa or less, and
the organic solvent-soluble resin film contains a urethane-bond-containing compound, and
wherein the apparent shear strength is obtained by trimming a surface area on each surface side of a sample to be measured at a constant speed of a vertical speed of 50 nm/s and a horizontal speed of 500 nm/s using a cutting edge, acquiring the horizontal force applied to the cutting edge and the trimmed sectional area at the time of trimming, and performing calculation based on the acquired horizontal force and trimmed sectional area according to Equation A, $$\tau = F_H / 2A \cot \Phi, \quad \text{(Equation A)}$$

in Equation A, $\tau$ represents an apparent shear strength (unit: MPa), $F_H$ represents a horizontal force (unit: N (newton)), A represents a trimmed sectional area (unit: mm$^2$), and $\Phi$ is 45°, and
the cutting edge is made of single crystal diamond having an edge width of 0.3 mm, an edge angle of 60°, a rake angle of 20° and a clearance angle of 10°.

2. The liquid crystal display device according to claim 1, wherein the urethane bond-containing compound has a partial structure represented by Formula 1,

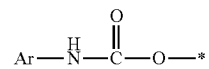
Formula 1 in Formula 1, Ar represents an aryl group, and the symbol "*" represents a bonding position with respect to another partial structure constituting the urethane bond-containing compound.

3. The liquid crystal display device according to claim 2, wherein the aryl group represented by Ar in Formula 1 is a phenyl group.

4. The liquid crystal display device according to claim 2, wherein the urethane bond-containing compound has two to four partial structures represented by Formula 1 in one molecule.

5. The liquid crystal display device according to claim 2, wherein the urethane bond-containing compound has two or three partial structures represented by Formula 1 in one molecule.

6. The liquid crystal display device according to claim 1, wherein the content of the urethane bond-containing compound in the organic solvent-soluble resin film is 20 parts by mass or greater with respect to 100 parts by mass of the organic solvent-soluble resin in a surface area on the backlight side and 12 parts by mass or less with respect to 100 parts by mass of the organic solvent-soluble resin in a surface area on the polarizer side.

7. The liquid crystal display device according to claim 6, wherein the content of the urethane bond-containing compound in the organic solvent-soluble resin film is 30 parts by mass or greater with respect to 100 parts by mass of the organic solvent-soluble resin in the surface area on the backlight side.

8. The liquid crystal display device according to claim 1, wherein the liquid crystal panel includes a front-side polarizing plate, a liquid crystal cell, and a rear-side polarizing plate, and
the rear-side polarizing plate is a polarizing plate including the organic solvent-soluble resin film.

9. The liquid crystal display device according to claim 1, wherein the organic solvent-soluble resin film is a cellulose acylate film.

10. The liquid crystal display device according to claim 9, wherein a degree of substitution of cellulose acylate contained in the surface area of the cellulose acylate film on the backlight side is in a range of 2.20 to 2.60.

11. The liquid crystal display device according to claim 1, wherein a diffusion member is positioned closest to the liquid crystal panel side in the backlight.

* * * * *